July 19, 1932.  A. J. MICHELIN  1,868,424
RAILWAY VEHICLE
Filed Nov. 10, 1930   2 Sheets-Sheet 1

Inventor
André J. Michelin
By
Henry Ooth Jr
atty.

July 19, 1932.  A. J. MICHELIN  1,868,424
RAILWAY VEHICLE
Filed Nov. 10, 1930  2 Sheets-Sheet 2
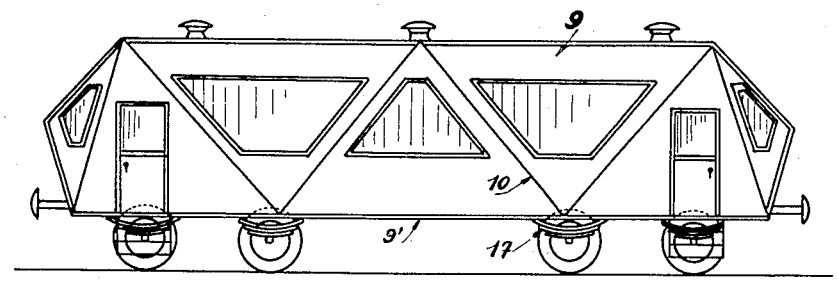
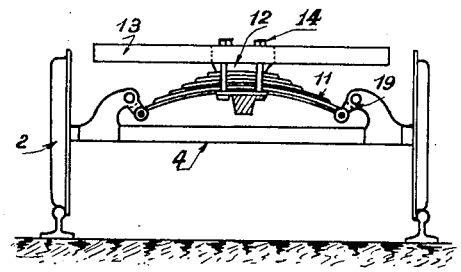
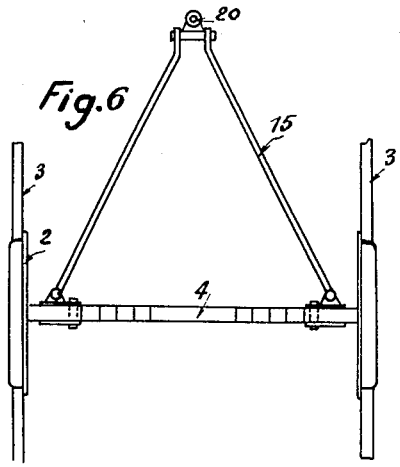
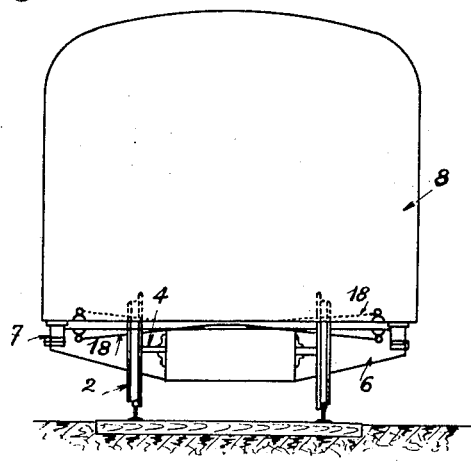
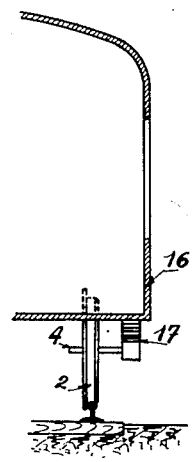
Inventor
André J. Michelin,
By Henry Orth
atty Patented July 19, 1932

1,868,424

UNITED STATES PATENT OFFICE

ANDRÉ JULES MICHELIN, OF PARIS, FRANCE, ASSIGNOR TO MICHELIN ET CIE., OF CLERMONT-FERRAND, FRANCE, A CORPORATION OF FRANCE

RAILWAY VEHICLE

Application filed November 10, 1930, Serial No. 494,767, and in France December 5, 1929.

It has already been proposed, in order to increase comfort and to diminish noise in railway vehicles to fit the wheels of said vehicles with pneumatic tires. However, this arrangement has the disadvantage that, in the event of one of the tires getting punctured, the wheel on which it is mounted runs on the rim and causes an unbalancing of the whole which impairs the safe running of the vehicle and may eventually cause a breakdown.

According to my invention, in order to obviate this drawback, the wheel axles are formed as a unit with the frame that supports the body of the vehicle, without springs being interposed between wheels and frame or with the interposition of springs the amplitude of the deformations of which is limited.

Each side-sill of the railway vehicle is constructed in a very rigid manner by being made for instance of a compound girder having a great height, so that if a pneumatic tire gets punctured, the frame does not move down in an appreciable way in the vicinity of the vertical plane passing through the axle of the wheel, provided, however, that the number of axles of the vehicle frame is greater than two. In order to still further diminish the downward displacement of the frame in the vicinity of the wheel the pneumatic tire of which has got punctured, the axles, in the case of the vehicle comprising four of them, are preferably disposed in pairs at both ends of the vehicle, the axles of each pair being arranged very close to each other.

With the arrangement according to my invention no damaging of the air tube and of the rim need be feared since the latter is no longer in contact with the rail and is maintained at a certain distance therefrom, contrary to what takes place in vehicles in which the axles are connected to the frame through elastic springs free to expand without being limited.

My invention also includes certain methods of constructing the frames and the bodies of the vehicles which may advantageously be utilized in connection with the device according to my invention.

Preferred embodiments of my invention will be hereinafter described with reference to the appended drawings, given merely by way of example, and in which:

Fig. 2 is an end view of the same vehicle.

Fig. 3 shows a vehicle the body of which is made of compound girders.

Fig. 4 is a section of the vehicle in the case of the axles being secured to the frame by means of clamped springs, the frame itself constituting the walls of the vehicle body.

Figs. 5 and 6 are an elevation and a plane view respectively of particular modes of construction of the axles.

Figure 1:
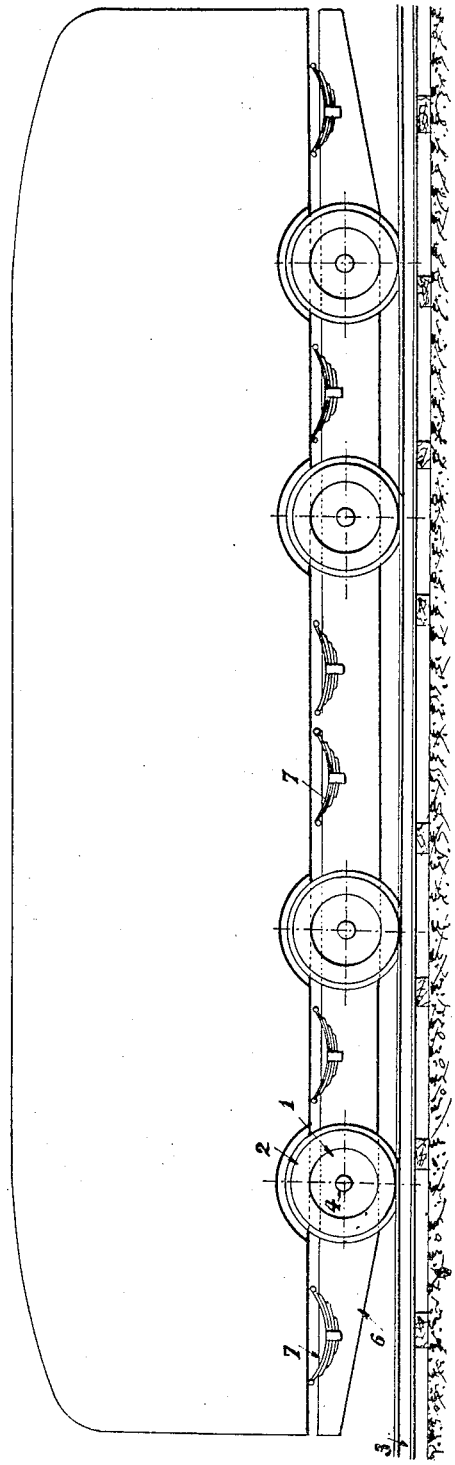
Fig. 1 is a diagrammatical lateral elevation of a railway vehicle according to my invention in which the axles are secured directly to the frame, which is connected to the vehicle body through the intermediary of springs and articulated braces.

Adverting to Fig. 1, it will be seen that wheels 1, provided with pneumatic tires 2, and running on rails 3, are supported by axles 4, the number of which is greater than two (four in the case of the figure), said axles being secured to frame 6, without springs being interposed between frame and axles. The body 8 of the vehicle is connected to the frame through the intermediary of springs 7 so as to give the body the usual springing. But in order to prevent any lateral displacement of the body with respect to the frame, which might desequilibrate the vehicle and cause the latter to overturn, I provide articulated braces 18, which are secured at one end to frame 6 and at the other end of the vehicle body, thus preventing any such lateral displacement of the vehicle body with respect to the frame. Such braces are disposed by pairs, each being secured to one side of the frame and to the opposite side of the body, the two braces of each pair crossing each other in their central part, as shown in Fig. 2. When one of the tires 2 gets punctured, the frame is not submitted to any tilting and the wheel carrying the punctured pneumatic tire ceases to be in contact with the rail. It results therefrom that the puncturing of a tire does not entail very serious consequences.

In Figs. 3 and 4 is shown another embodiment in which the axles are connected to the frame through the medium of clamped springs the expansion of which is limited by means of the clamps. In this case, the frame itself may constitute the walls 16 of the vehicle body, which in the case of Fig. 3 consists of compound girders comprising for instance two flanges 9 and 9' and braces 10. The clamped springs are shown in 17.

In this case also the puncturing of a pneumatic tire does not present any danger, it being understood that the wheel on which said pneumatic tire is mounted will be no longer in contact with the rail.

Figs. 5 and 6 are a lateral elevation and a plane view respectively of an arrangement according to which the axles are connected to the frame in such manner as to possess a certain mobility in the transversal and longitudinal directions while satisfying to the conditions that have already been indicated concerning relative displacements in the vertical direction.

In the arrangement shown in these figures, the axle is connected to the frame through the intermediary of two shackles 19 connecting the axle to the ends of a transverse spring 11 secured to frame 13 through the intermediary of rubber blocks 12. In the embodiment shown in these figures, this securing is obtained by means of bolts 14.

The limitation of the lateral displacements of the axle may be obtained through any known means, for instance an antiparallellogram or a Hart reversing apparatus. In the case shown in these figures, this result can be more simply obtained by means of a pony truck 15, which may be connected to the frame through a ball and socket joint 20. In this arrangement, spring 11 and shackles 19 do not prevent axle 4 from sliding in a lateral direction with respect to frame 13. But, as above stated, that lateral displacement is limited in a known manner by a pony truck 15. In the event of a tire getting punctured, as frame 13 is supported by at least two other pairs of wheels, said frame keeps through spring 11 the wheel whose tire is punctured out of contact with the track rail.

Although this arrangement is particularly applicable to railway vehicles fitted with pneumatic tires, it may, without departing from the spirit of my invention, be applied to railway vehicles that are not provided with pneumatic tires and even to vehicles adapted to be used on roads, provided that they comprise more than two axles. For, in the case of an axle getting broken in the vicinity of a wheel, or in the case of any other deterioration resulting in a wheel becoming out of use, the vehicle will nevertheless be capable of continuing its way.

While I have, in the above description, endeavored to disclose what I believe to be an efficient and practical embodiment of my invention, it is to be understood that the invention is not limited by the specific details as shown, but that it is subject to any and all structural variations which may express the invention and at the same time come within the scope of the appended claims.

What I claim is:

1. A railway vehicle comprising a rigid frame, more than two axles, wheels on said axles, pneumatic tires on said wheels, and means for separately connecting each of said axles to said frame adapted to keep the relative displacement of said two parts below a certain value.

2. A vehicle provided with pneumatic tires comprising a very rigid frame, more than two wheel axles, and elastic means for separately connecting each of said axles to said frame adapted to take but a limited expansion, whereby, in the event of a tire getting punctured, the corresponding wheel is maintained suspended and does not run on the rim.

3. A railway vehicle provided with pneumatic tires comprising a very rigid frame, more than two wheel axles, rigid means for connecting the axles to the frame, whereby, in the event of a tire getting punctured, the corresponding wheel is kept suspended above the rail and does not run on the rim, a vehicle body, springs for connecting said body to the frame, and transversal braces between the body and the frame adapted to prevent lateral relative displacement of said parts.

4. A railway vehicle provided with pneumatic tires comprising four wheel axles arranged in pairs at both ends of the vehicle, a very rigid frame, rigid means for connecting the axles to the frame, whereby, in the event of a tire getting punctured, the corresponding wheel is kept suspended above the rail and does not run on the rim, a vehicle body, springs for connecting said body to the frame, and transversal braces between the body and the frame adapted to prevent transversal relative displacement of said parts.

5. A railway vehicle provided with pneumatic tires comprising more than two wheel axles, two very rigid side-frames constituting the walls of the vehicle body, springs interposed between said side-frames and the wheel axles adapted to take but a limited expansion, whereby, in the event of a tire getting punctured, the corresponding wheel is not applied against the rail and accordingly does not run on the rim.

6. A railway vehicle provided with pneumatic tires comprising four wheel axles arranged in pairs at both ends of the vehicle, two very rigid side-frames constituting the walls of the vehicle body, springs interposed between said side-frames and the wheel axles adapted to take but a limited expansion, whereby in the event of a tire getting punctured, the corresponding wheel is not applied against the rail and accordingly does not run on the rim.

7. A railway vehicle provided with pneumatic tires comprising more than two wheel axles, a very rigid frame, transversal springs adapted to take a limited expansion interposed between the frame and each of said axles respectively, whereby, in the event of a tire getting punctured, the corresponding wheel is kept suspended above the rail and does not run on the rim, and means for limiting the transversal displacements of each axle respectively.

8. A railway vehicle provided with pneumatic tires comprising more than two wheel axles, a very rigid frame, transversal springs adapted to take a limited expansion interposed between the frame and each of said axles respectively, whereby, in the event of a tire getting punctured, the corresponding wheel is kept suspended above the rail and accordingly does not run on the rim, and a pony truck for connecting each of said wheel axles to the frame adapted to limit the transversal displacements of the axles.

9. A railway vehicle provided with pneumatic tires comprising in combination more than two wheel axles, a very rigid frame, transversal springs adapted to take a limited expansion secured to said frame and disposed each above one axle respectively, two shackles for connecting the ends of each spring to the corresponding axle respectively, whereby, in the event of a tire getting punctured, the corresponding wheel is kept suspended above the rail and accordingly does not run on the rim, and a pony truck for connecting each wheel axle to the frame adapted to limit the transversal displacements of the axles.

In testimony that I claim the foregoing as my invention, I have signed my name.

ANDRÉ JULES MICHELIN.